(No Model.)
J. W. CRONAN.
COMPUTING WEIGHING SCALE.
No. 524,164. Patented Aug. 7, 1894.
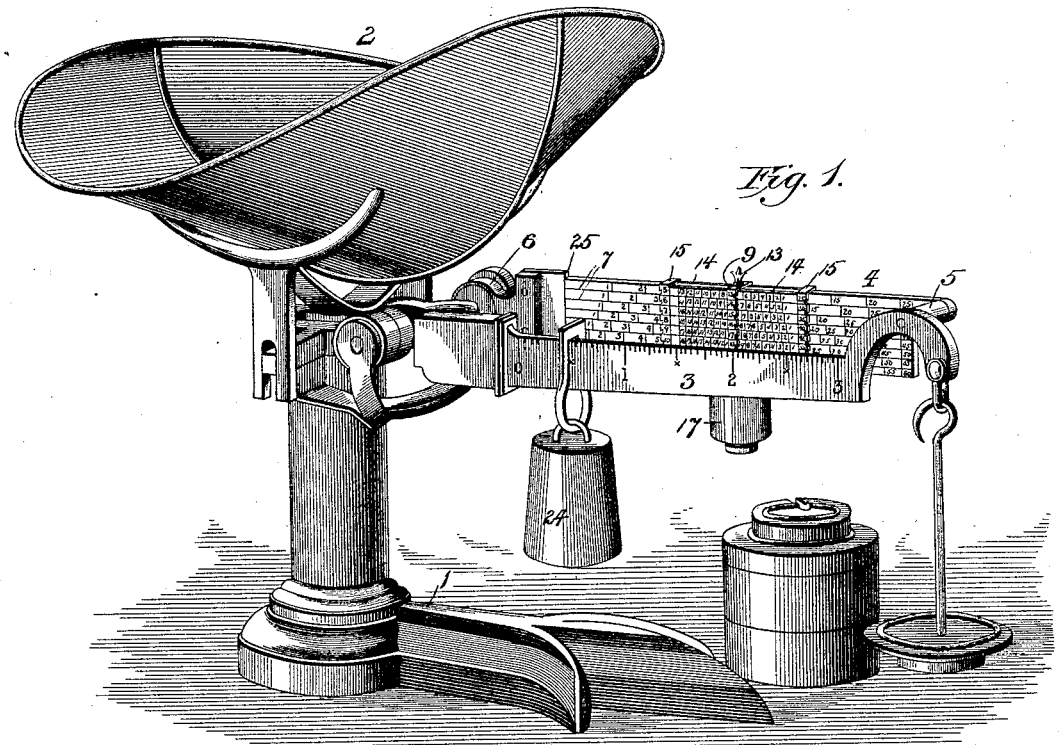
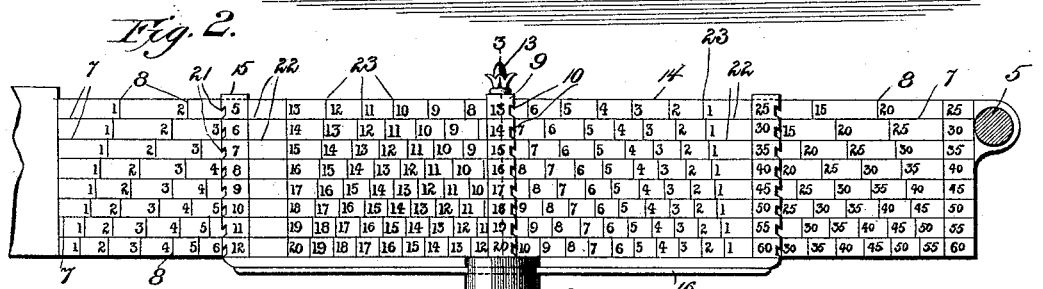
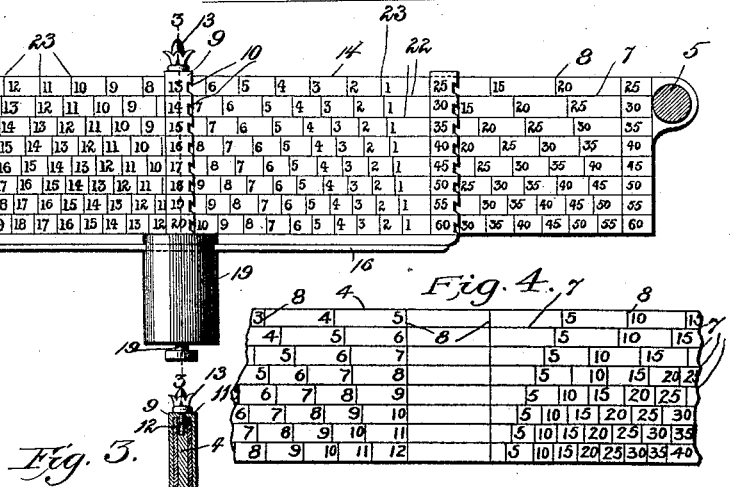
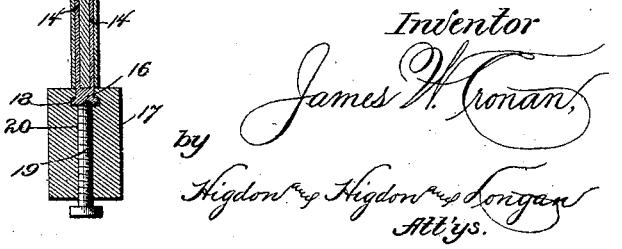
Witnesses:
John Onders Jr.
W. J. Sankey
Inventor
James W. Cronan,
by
Higdon & Higdon & Longan
Att'ys.
THE NORRIS PETERS CO., PHOTO-LITHO., WASHINGTON, D. C.

UNITED STATES PATENT OFFICE.

JAMES W. CRONAN, OF ST. LOUIS, MISSOURI.

COMPUTING WEIGHING-SCALE.

SPECIFICATION forming part of Letters Patent No. 524,164, dated August 7, 1894.

Application filed July 17, 1893. Serial No. 480,706. (No model.)

*To all whom it may concern:*

Be it known that I, JAMES W. CRONAN, of the city of St. Louis and State of Missouri, have invented certain new and useful Improvements in a Combined Price and Weighing Scale, of which the following is a full, clear, and exact description, reference being had to the accompanying drawings, forming a part hereof.

My invention relates to an improved price and weighing scale, and consists in the novel construction, combination and arrangement of parts hereinafter specified and designated in the claims.

The object of my invention is to provide an improved scale of this class, which shall be adapted for use in the ordinary manner—that is, to determine units and fractions of units of weight—and which is also adapted to facilitate the making of computations by which the quantity of a commodity at a given price per unit, may be readily ascertained and sold.

In the drawings: Figure 1 is a perspective view of a scale having my invention applied thereto. Fig. 2 is an enlarged view of a portion of the price beam. Fig. 3 is a transverse sectional elevation on the line 3—3 of Fig. 2. Fig. 4 is a detail view, illustrating a portion of the price-beam, enlarged, with the adjacent parts removed therefrom, to display two sets of graduations thereon.

I have shown my invention applied to a small scale having a scoop, but it will be evident that it may be applied to scales of many different varieties.

1 indicates the base, 2 the scoop and 3 the beam of an ordinary scale.

The scale-beam 3 and its mountings being a well known construction need not therefore be described in detail.

4 indicates what I term the price-beam, which is preferably applied as an attachment to move with the ordinary beam 3, although said price-beam may be made to take the place of the ordinary beam altogether. The price-beam is preferably located as here shown with its edges parallel with the edges of the common beam, with its sides vertical and parallel with the sides of said common beam, and secured in position at one side of said last named beam by means of brackets 5 and 6. The price-beam 4 is provided with numerals and lines properly arranged to indicate the amount and value at different prices of the article weighed by the scale. These preferably consist of a series of parallel horizontal lines 7, each of which is subdivided to indicate spaces, by short vertical lines 8. The spaces which are located between the center of the length of the horizontal lines and the inner ends thereof are marked by numerals 1, 2, 3, 4 and 5, &c., the numeral 1 being in each case located next adjacent the inner end of said lines, while the horizontal lines 7 between the center of their length and their outer ends are subdivided into similar spaces indicated by marks which I will denominate half-dimes, that is—the space next adjacent the center of the length of said lines is marked by the numeral 5, while the next adjacent space of each horizontal line is marked by the numeral 10, and so on increasing by five to the outer end of each of said lines. I intend the numeral 5 to indicate a half-dime wherever it is used in the present drawings. The opposite side of the price-beam is similarly provided with lines, spaces and numerals at points exactly opposite the points at which the lines, spaces and numerals here shown are located, so that the salesman may observe same on one side and the purchaser have a view of the opposite side of the beam, if so desired.

Fixed centrally of the length of the horizontal lines 7, upon each side of the beam 4 is a vertical stop 9 having its outer vertical edge provided with a series of serrations which act as pointers 10, and its face is provided with the numerals 13, 14, 15, 16, 17, 18, 19, and 20, with the numeral of the smallest denomination located adjacent its upper end and in horizontal alignment with the numerals which indicate the spaces above the first horizontal line 7, and so on down to the lower end of said stop, the next higher numeral on the stop being located in the next lower space in alignment with the space above the next lower horizontal line on said beam.

The upper ends of the stops on opposite side of the price-beam 4 are preferably connected by means of a transverse horizontal plate 11, through which passes a screw 12 having an ornamental head 13. This screw is passed through an aperture in said plate and is threaded into the upper edge of said beam.

Loosely mounted to slide upon the beam 4, one upon each side of the same in spaces between the beam and said stop 9 are vertical plates 14 oppositely located, and the upper edges of which are connected by short transverse plates 15, one of which is located at or adjacent the ends of said plates so as to extend above the upper edge of said price-beam. The lower edges of the plates 14 are connected throughout their lengths by a longitudinal bar 16, which is substantially T-shaped in cross-section, or of dove-tail shape in cross-section, so as to form a track for the support of a combined poise and counterbalance hereinafter described.

It will be observed that the bar or track 16 projects a distance below the lower edge of the price-beam 4. The upper edges of the plates 14 lie flush with the upper edge of said beam, while the plates 15 project above said edges.

17 indicates a combined poise and counterbalance, which is provided in its upper end with a transverse horizontal dove-tail slot 18, the cross section of which corresponds to the cross-section of the bar or track 16. The upper edge of this slot is open. The part 17 is mounted upon the bar or track 16 with its dove-tail slot engaging the same, and with its upper end about on a line with the lower horizontal line 7 of the beam 4, so that when the plates 14 and the parts 17 are moved upon said beam the upper ends of said parts may pass beneath the lower end of the stop 9 on each side of the beam. The part 17 is adjustably secured in position by means of a set screw 19 which is threaded into a vertical passage 20 formed in the said part, so that the head upon said screw will project beneath said part in a position convenient for engagement by the operator in adjusting the part as a counterbalance, while the upper end of said screw engages the bar or track 16 and locks the said part at any desired point upon said bar or track.

Each end of each plate 14 is provided with a series of serrations which act as pointers 21, said pointers projecting from said ends, one directly above each horizontal line 7 of the beam 4 and having their outer ends free. The opposite plates 14 are provided at a point adjacent their outer ends with a series of numerals, such as 25, 30, 35, 40, &c., the numeral of smallest denomination being located closely adjacent the upper edge of said plates, and the remaining numerals of said series being located in a vertical line beneath. Said plates at a point adjacent their contiguous inner ends are each provided with a series of numerals 5, 6, 7, 8, &c., upon their outer surfaces, and arranged in vertical alignment. Said plates are also provided with a series of horizontal parallel lines 22, each of which is divided into divisions or spaces by means of short vertical lines 23, and the divisions or spaces thus formed are each provided with a numeral. The spaces thus formed are numbered in a manner the reverse of that in which the spaces marked off upon the inner portion of the beam 4 are numbered, for the reason that the spaces upon said plates are numbered from their outer ends inward, each beginning with 1, 2, 3, &c., above each horizontal line 22. The plates 14 upon opposite sides of the beam 4, are clearly shown in Figs. 1 and 3.

The operation is as follows: When the beam 4 is applied as here shown, as an attachment to an ordinary scale, the scale may be readily balanced by throwing the common poise 24 back to zero and sliding the plates 14 inward upon the beam 4 until the plates 15 at their inner ends contact with a shoulder 25 formed upon said beam, and then adjusting the combined poise and counterbalance 17 upon the bar or track 16, which may be done by manipulating the screw 19. This is the normal position of these parts. Supposing that a commodity is for sale at twelve (12) cents per pound, and that a purchaser desires six (6) cents' worth thereof. The salesman will first throw the common poise 24 back to zero, and then slide the combined poise and counterbalance 17 and the plates 14 outward upon the beam 4 until it occupies the position here shown clearly in Fig. 2, until the numeral 6 beneath the lower horizontal line 7 of the beam 4 adjacent the inner end of said beam is exposed to view, and then the salesman places a sufficient quantity of the desired commodity in the scoop 2 to counterbalance the weight of the parts thus situated upon said beam. It will be observed that the numeral 12 in the space at the lower inner corner of the plates 14 is now closely adjacent said numeral 6 upon the beam. The vertical series of numerals adjacent each end of the plates 14, and those upon the stops 9, indicate, in cents, the price per pound at which various commodities are to be sold. Therefore, the commodity which the purchaser desires being sold at twelve (12) cents per pound, the above parts are adjusted to give him one-half pound, which is six (6) cents' worth. In a similar manner, with commodities worth five, six and seven cents per pound, these parts are adjusted upon the beam 4 until the numeral representing the price per pound in the vertical series of numerals at the ends of the plates 14, is brought closely adjacent the numeral upon the said beam in the same horizontal line representing the amount which the purchaser desires to spend. The numerals upon the beam 4 adjacent its inner end represent the smallest amounts of money which purchasers may desire to expend. If a purchaser desires to expend an amount greater than that indicated by any one of these numerals or if the price per pound is greater than the amount indicated by the numeral at the bottom of the series of numerals adjacent the inner ends of said plates, then the salesman makes his computation by the marks upon the sides of said plates which are located intermediate of the vertical series of figures adjacent the ends of said plates. For instance, leaving the parts in the position just described, and supposing that a purchaser desires to purchase ten cents' worth of a commodity which sells at twenty cents per pound, it will be found that the numeral 10 in the bottom row of marks upon said plates is now located closely adjacent the numeral 20 at the lower end of the series of marks upon the stops 9, which clearly indicate that the customer or purchaser is to receive such an amount of the commodity as will balance the scale with the parts in such position. Likewise, if a purchaser desires to expend an amount greater than that indicated by any one of the numerals upon the sides of the plates 14 intermediate of the vertical series of numerals adjacent their ends, or if the price per pound is greater than the amount indicated by the numeral at the bottom of vertical series of numerals on the stops 9, then the salesman makes his computation by the marks upon the outer portion of the beam 4 intermediate of said stops and the vertical series of numerals adjacent said outer end. For instance, leaving the parts in the position just described, and supposing that the purchaser desires thirty cents' worth of a commodity, the price of which is sixty cents per pound, it will be found that the numeral 60 at the bottom of the series of numerals at the outer ends of the plates 14 is located in juxtaposition to the numeral 30 just beneath the bottom horizontal line 7 of said beam, and so on, according to the amount which the purchaser desires to expend, and to the price per pound at which the commodity sells. All that the salesman need do is to slide the plates 14 upon the beams 4, in any case, until the price per pound and the amount which the purchaser desires to expend, in cents, are brought closely adjacent, or until the pointers 21 and 10 have their outer ends brought to the vertical lines 8 or 23 next adjacent the numerals upon the beam 4 and the plates 14, which indicate such amounts.

It will thus be observed that I have provided the opposite faces of the price-beam with three separate and distinct series of numerals or marks for indicating the amounts of money which purchasers may desire to expend, and also that I have provided three separate vertical columns of marks or numerals for indicating the price per pound of various commodities, all co-operating to produce the desired result in a very simple and efficient manner.

I am aware that heretofore various forms of computing scales have been constructed, and some with a price-beam provided with cost-marks and having narrow, vertical plates forming weights sliding thereon, and I do not therefore broadly claim such as my invention.

What I claim is—

1. The improved scale, having a price beam provided with graduation marks denoting cost visible from both sides of said beam, a vertical stop having its outer surface provided with a vertical series of marks indicating the price per pound at which commodities may be sold and fixed upon said beam intermediate of the length thereof, and vertical sliding-plates arranged to slide one upon each side of said beam and provided with indicating marks or numerals, substantially as herein specified.

2. The improved scale, having a price-beam provided on its surface with graduation marks denoting cost visible from both sides of said beam, sliding plates mounted one upon each side of said beam and provided with graduation marks denoting prices of commodities, means for uniting the upper edges of said plates, a fixed-stop having graduations and located on said beam adjacent said plates and a combined poise and counterbalance adjustably carried by said plates so as to be adjusted longitudinally thereof, substantially as herein specified.

3. The improved scale, having a price-beam provided with graduating marks denoting cost, and the amount and value of the article to be weighed by the scale, forming a separate series of marks adjacent each end of said beam, a vertical stop fixed centrally of the length of said beam upon the same and having pointers upon its outer edge and its face provided with marks denoting prices of commodities, vertical plates 14 loosely mounted to slide upon said beam one upon each side thereof, means which connects the upper edges of said plates, a longitudinal bar which connects the lower edges of said plates and forms a track, a combined poise and counterbalance adjustably mounted upon said track, and means for adjustably securing said combined poise and counterbalance in position upon this track, substantially as herein specified.

4. In a scale, the improved price-beam provided with graduation marks indicating cost visible from both sides thereof, and having fixed thereon a vertical stop projecting upon each side of said beam at a point intermediate of the ends thereof and constructed to act as a stop for plates which slide upon said beam, and also arranged with a series of pointers projecting from its edges in a vertical line, substantially as herein specified.

5. In a scale, the combination of a price-beam provided with graduation marks denoting cost visible from both sides thereof, a vertical stop fixed centrally of the length of the portion of said beam which is provided with graduation marks so as to project upon each side thereof, and having its outer vertical edges provided with a series of pointers and its outer faces provided with a vertical series of numerals, and sliding-plates provided with indicating-marks and arranged to slide upon each side of said beam and be limited in movement by said stop, substantially as herein specified.

6. In a computing scale a beam provided with graduations, a stop fixed thereon intermediate of the ends thereof, and a weight arranged to act as a poise and movable on said beam in the spaces between said fixed stop and each end of the beam.

In testimony whereof I affix my signature in presence of two witnesses.

JAMES W. CRONAN.

Witnesses:
EDWARD EVERETT LONGAN,
JNO. C. HIGDON.